(12) United States Patent
Lee et al.

(10) Patent No.: US 9,552,357 B1
(45) Date of Patent: Jan. 24, 2017

(54) MOBILE DEVICE SEARCH OPTIMIZER

(75) Inventors: Wing K. Lee, Ashburn, VA (US); Dora Potluri, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1666 days.

(21) Appl. No.: 12/426,089

(22) Filed: Apr. 17, 2009

(51) Int. Cl.
*G06F 7/32* (2006.01)
*G06F 17/30* (2006.01)

(52) U.S. Cl.
CPC ......... *G06F 17/30* (2013.01); *G06F 17/30876* (2013.01)

(58) Field of Classification Search
CPC ................ G06F 17/30; G06F 17/30731; G06F 17/30876; H04N 21/2668; H04N 21/47205; H04N 21/4725; H04N 21/8405; H04N 21/8583
USPC ................................................ 707/999.006, 6
See application file for complete search history.

(56) References Cited

U.S. PATENT DOCUMENTS

| | | | |
|---|---|---|---|
| 6,249,252 B1 | 6/2001 | Dupray | |
| 6,405,044 B1 | 6/2002 | Smith et al. | |
| 6,449,486 B1 | 9/2002 | Rao | |
| 6,505,046 B1 | 1/2003 | Baker | |
| 6,760,582 B2 | 7/2004 | Gaal | |
| 6,801,778 B2 | 10/2004 | Koorapaty et al. | |
| 6,961,367 B2 | 11/2005 | Simic et al. | |
| 7,092,722 B1 | 8/2006 | Oh et al. | |
| 7,343,317 B2 | 3/2008 | Jokinen et al. | |
| 7,376,430 B2 | 5/2008 | Matsuda | |
| 7,400,884 B2 | 7/2008 | Fok et al. | |
| 7,840,538 B2 * | 11/2010 | Joshi et al. | 707/672 |
| 7,945,271 B1 | 5/2011 | Barnes et al. | |
| 8,010,134 B2 | 8/2011 | Barnes et al. | |
| 8,233,879 B1 | 7/2012 | Lee et al. | |
| 2002/0086680 A1 | 7/2002 | Hunzinger | |
| 2003/0008668 A1 | 1/2003 | Perez-Breva et al. | |
| 2003/0040850 A1 * | 2/2003 | Najmi et al. | 701/1 |
| 2003/0065805 A1 | 4/2003 | Barnes, Jr. | |
| 2004/0064447 A1 * | 4/2004 | Simske et al. | 707/5 |
| 2004/0140361 A1 | 7/2004 | Paul et al. | |
| 2004/0198386 A1 | 10/2004 | Dupray | |
| 2004/0205051 A1 * | 10/2004 | Kim et al. | 707/3 |
| 2004/0243519 A1 | 12/2004 | Perttila et al. | |
| 2005/0102329 A1 | 5/2005 | Jiang et al. | |
| 2005/0164704 A1 | 7/2005 | Winsor | |
| 2005/0191998 A1 | 9/2005 | Onyon et al. | |

(Continued)

OTHER PUBLICATIONS

Lightningcast, Inc., "Lightningcast Mobile Video Advertising Solution," May 2, 2005, 14 pgs.

(Continued)

*Primary Examiner* — Wei Zhen
*Assistant Examiner* — Mohammed Huda (57) ABSTRACT

A system is provided for a mobile device search optimizer. The system includes a storage device, a processor, and an optimizer engine. The optimizer engine, when executed by the processor, stores user input for a mobile device to the storage device. The optimizer engine also identifies a pattern of multiple user inputs entered to select a presentation view of an application on the mobile device during multiple occasions. Additionally, the optimizer engine configures the application to offer a user input option to display the presentation view in response to a selection of the user input option.

18 Claims, 4 Drawing Sheets

(56) References Cited

U.S. PATENT DOCUMENTS

| | | |
|---|---|---|
| 2005/0192024 A1 | 9/2005 | Sheynblat |
| 2006/0089153 A1 | 4/2006 | Sheynblat |
| 2006/0178932 A1 | 8/2006 | Lang |
| 2006/0183469 A1 | 8/2006 | Gadson |
| 2007/0161380 A1 | 7/2007 | Fok et al. |
| 2007/0239671 A1* | 10/2007 | Whitman et al. ................. 707/2 |
| 2008/0010114 A1 | 1/2008 | Head |
| 2008/0066080 A1* | 3/2008 | Campbell .................... 719/314 |
| 2008/0119206 A1 | 5/2008 | Shalmon et al. |
| 2008/0227467 A1* | 9/2008 | Barnes et al. ............. 455/456.2 |
| 2008/0305795 A1* | 12/2008 | Murakami et al. ........ 455/435.1 |
| 2009/0303676 A1* | 12/2009 | Behar et al. ............. 361/679.27 |

OTHER PUBLICATIONS

Lee, Wing K., et al., "New Mobile Device Personalization Based on Previous Mobile Device Usage," U.S. Appl. No. 12/426,096, filed Apr. 17, 2009.
Office Action dated Jul. 19, 2011, U.S. Appl. No. 12/426,096, filed Apr. 17, 2009.
Final Office Action dated Nov. 30, 2011, U.S. Appl. No. 12/426,096, filed Apr. 17, 2009.
Advisory Action dated Feb. 21, 2012, U.S. Appl. No. 12/426,096, filed Apr. 17, 2009.
Notice of Allowance dated Mar. 13, 2012, U.S. Appl. No. 12/426,096, filed Apr. 17, 2009.
Supplemental Notice of Allowance dated Apr. 6, 2012, U.S. Appl. No. 12/426,096, filed Apr. 17, 2009.

* cited by examiner

MOBILE DEVICE SEARCH OPTIMIZER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A mobile device may be a mobile phone, a wireless handset, a pager, or a personal digital assistant (PDA). A mobile device may include mobile device software applications that enable a user to communicate via telephone calls, email, and/or text messages. Mobile device applications may also provide the capabilities of a web browser, a navigation device, a television, a video player, a video recorder, a gaming device, a camera, a radio, an audio recorder, a calculator, an alarm clock, an address book, a calendar, and a memo pad for a user.

SUMMARY OF THE INVENTION

In some embodiments, a system is provided for a mobile device search optimizer. The system includes a storage device, a processor, and an optimizer engine. The optimizer engine, when executed by the processor, stores user input for a mobile device to the storage device. The optimizer engine also identifies a pattern of multiple user inputs entered to select a presentation view of an application on the mobile device during a multiple occasions. Additionally, the optimizer engine configures the application to offer a user input option to display the presentation view in response to a selection of the user input option.

In some embodiments, a computer implemented method is provided for a mobile device search optimizer. A plurality of user inputs are stored to a storage device, wherein the plurality of user inputs is associated with a plurality of searches conducted via each of a plurality of search engines via a mobile device. A plurality of search efficiencies is determined based on the plurality of user inputs, wherein each search efficiency is associated with one of the plurality of search engines. The plurality of search efficiencies is displayed via a user interface to suggest a use of a search engine of the plurality of search engines.

In some embodiments, a system is provided for a mobile device search optimizer. The system includes a storage device, a processor, and an optimizer engine. The optimizer engine, when executed by the processor, stores a plurality of search terms input via a plurality of search engines for a plurality of mobile devices to the storage device. The optimizer engine also identifies the plurality of search terms that are input more than a threshold amount during a time period. Additionally, the optimizer engine determines the identified plurality of search terms that are associated with at least one of a plurality of media files. Furthermore, the optimizer engine configures a user interface on a mobile device to provide a modified order of access for a media search engine to the plurality of media files based on the determined plurality of search terms to enable a user to access the content via the media search engine using the modified order of access.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Searching for data on a mobile device may become time consuming or even frustrating for users because of the relatively small amount of data displayed at any time by the relatively small mobile device display screen. Furthermore, a user may not be familiar with the optimal way to search for information because of the complex nature of each of the numerous applications on a mobile device. For example, some users may spend much time searching through a long list of videos to play on a video player because only a few of the videos and their accompanying images and/or descriptions are displayed at a time. In another example, a user may spend much time using a default search engine for a web browser to look for content before either abandoning the search or switching to another search engine to continue the search. In yet another example, a user may spend much time searching a long list of music available for downloading to the mobile device because the list displays many musical selections in which the user is not interested.

Embodiments of the present disclosure provide systems and methods for a mobile device search optimizer. An optimizer engine may store mobile device user input, such as searches of video title lists, to a storage device. The optimizer engine may identify a pattern of multiple user inputs entered to select a presentation view of an application on the mobile device during multiple occasions, such as recent inputs to a default screen displaying video titles that begin with the letter "a" resulting in displaying the screen of video titles that begin with the letters "r," "s," and "t." The optimizer engine may configure the application to offer a user input option to display the presentation view. For example, the optimizer engine configures the application to display a soft key or button on the default screen that enables a user viewing a default screen of video titles that begin with the letter "a" to jump directly to a screen that displays video titles beginning with the letter "s." The user may be able to save much time and avoid frustration with the limited size of the mobile device display screen by taking a shortcut to search from a point in the video title list where the user recently and frequently selected video titles.

Although each search engine provider may be able to analyze a mobile device user's inputs to their own search engine, these search engine providers may not be able to determine whether the user conducted the same search using a different search engine before or after using their own search engine. The mobile device user inputs that are stored to the storage device may be associated with multiple searches conducted via multiple search engines. This user inputs may identify when the mobile device user located content using a first search engine, abandoned a search, and/or switched to a second search engine to continue a search previously conducted via the first search engine. Analysis of the stored user inputs may determine search efficiencies for each of the search engines. Displaying these search efficiencies may enable the user to conduct more efficient searches by indicating which search engines produced the desired results most frequently and most quickly. The search efficiencies may also indicate which search engines produced the desired results most frequently and most quickly for a given topic, a key term, or a media type being searched or downloaded. Viewing these search efficiencies may enable a user to save much time and reduce search frustration.

The optimizer engine may store multiple search terms input via multiple search engines for multiple mobile devices to the storage device, and identify the most frequent search terms during a time period. The optimizer engine may determine which of the most frequent search terms are associated with at least one of multiple media files, such as the most frequent searches for recording artists who will soon be offering new music for downloading. The optimizer engine may configure a mobile device display screen to provide a modified order of access for a media search engine to the multiple media files, such as displaying an artist's newly available music for downloading first on the list of available music to a user who conducted searches via a media search engine using the artist's name. This modified order of access may save the user much time by enabling the user to more quickly access the available content in which the user is interested.

The optimizer engine analyses the user input to individual mobile devices, and configures an individual mobile device to enable more efficient searches based on the individual user's inputs to their mobile device. These configurations enable mobile device applications to be personalized based on a specific user's previous inputs, in contrast to the generic configurations that application developers believe might be useful to the largest number of mobile device users. This personalization may save much time for the user and increase the user's customer satisfaction.

Figure 1:
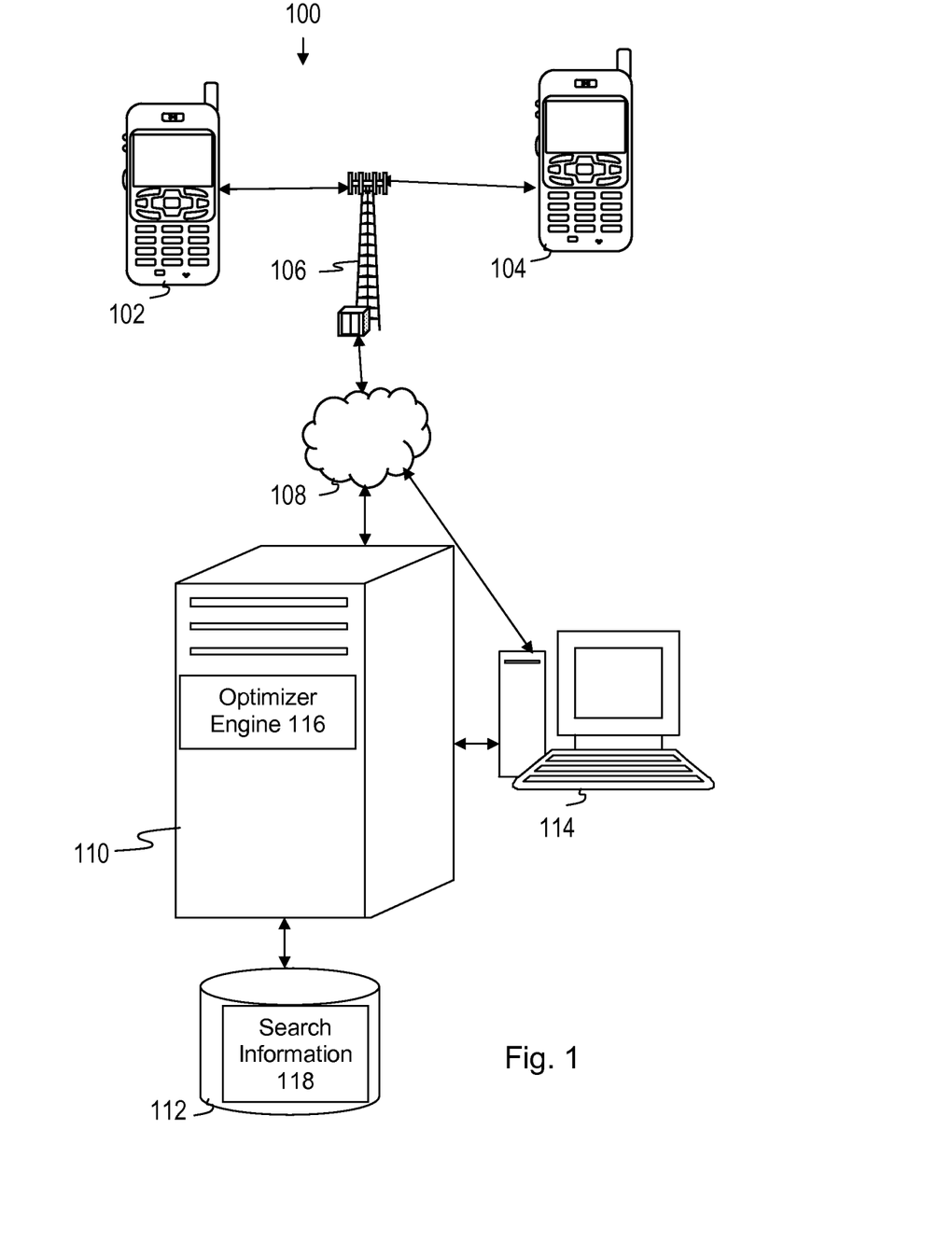
FIG. 1 illustrates a system for a mobile device search optimizer according to some embodiments of the present disclosure.

Turning now to FIG. 1, a diagram of a system 100 for a mobile device search optimizer is depicted according to embodiments of the present disclosure. The system 100 includes a first mobile device 102, a second mobile device 104, a base transceiver station 106, a communication network 108, a server 110, a data store 112, and a user interface 114. The mobile devices 102-104 may communicate with the server 110 via the base transceiver station 106 and the communication network 108. Although depicted as communicating via the same base transceiver station 106, the mobile devices 102-104 may communicate via different base transceiver stations 106.

The user interface 114 may be associated with an enterprise, such as a mobile device service provider or a search engine provider. The user interface 114 may directly communicate with the server 110, or indirectly communicate with the server 110 via the communication network 108.

The server 110 includes an optimizer engine 116. The server 110 communicates with the data store 112, which includes search information 118. Although depicted separately, the server 110, the data store 112, and their functions may be combined together in any combination.

The optimizer engine 116 may store user input for the mobile device 102 as search information 118 in the data store 112. The optimizer engine 116 may identify a pattern in the search information 118 of multiple user inputs entered to select a presentation view of an application on the mobile device 102 during multiple occasions. For example, the search information 118 may be multiple user inputs to a default screen displaying video titles that begin with the letter "a" that results in displaying the screen of video titles that begin with the letters "r," "s," and "t." The optimizer engine 116 may configure the application to offer a user input option to display the presentation view. In an embodiment, this user input option may allow the user of the mobile device 102, 104 to select with one input a presentation view that formerly involved selecting a sequence of several inputs. For example, a video selection application on the mobile device 102 may display a soft key or button that enables a user viewing the default screen of video titles that begin with the letter "a" to jump directly to a screen that displays video titles beginning with the letter "s." In this example, the user may be able to save much time and avoid frustration with the limited size of the display screen for the mobile device 102 by more quickly starting a search from a point in the video title list where the user recently and frequently selected video titles.

The user input option may include a navigation element in a document that enables navigation to another section of the document or another section of another document. For example, a user may frequently respond to a web browser application page by making the consecutive selections of options corresponding to sports, football, professional football, scores, the user's favorite professional football team, and highlights of the user's favorite professional football team. The newly configured user input option may enable the user to directly select a shortcut to view the highlights of their favorite professional football team's games from the general web browser application page. The optimizer engine 116 may communicate a message to the mobile device 102, where the message provides an explanation about the new user input option. For example, the optimizer engine 116 may send an email to the mobile device 102 that the user may read to understand the shortcut added for viewing the highlights of their favorite professional football team's games. The optimizer engine 116 may configure applications on the mobile device 102 to add personalized shortcuts based on the user's previous inputs. While mobile device applications may be designed to provide options in a sequence based on the perceived preferences for the majority of the millions of users who may use the applications, the optimizer engine 116 optimizes the usage of applications for each individual user based on their actual usage.

The search information 118 may be user inputs associated with multiple searches conducted via multiple search engines on the mobile device 102. The optimizer engine 116 may analyze the search information 118 to identify when the mobile device user located the content using a first search engine, abandoned a search, and switched to a second search engine to conduct a search previously conducted via the first search engine. For example, the optimizer engine 116 may analyze the search information 118 based on selections of search results, time spent displaying selected search results, and the number of pages viewed when search results are selected for each search engine. The optimizer engine 116 may also analyze subsequent searches using the same search term, whether using the same search engine or a different search engine.

Based on the analysis of the search information 118, the optimizer engine 116 may determine search efficiencies for each of the search engines, such as the percentages of searches that are considered to be successful, and the amount of information viewed for each successful search. Additionally, the optimizer engine 116 may partition or parameterize the analysis of the search information 118 and the determined search efficiencies based on the type of information or media obtained or downloaded. The optimizer engine 116 may display these search efficiencies to various user interfaces, such as the display screen for the mobile device 102 and the user interface 114. The displayed search efficiencies may include a category of search terms and search efficiencies associated with the categories of search terms. For example, the mobile device default search engine may be more efficient at locating entertainment news for the user, whereas another search engine accessed through the web browser application may be more efficient at locating technical information for the user. Displaying efficiencies associated with search categories may guide the user to select the default search engine to search for entertainment news and the other search engine for technical information. Viewing the personalized search efficiencies may enable the user to conduct more efficient searches by indicating which search engines produced the desired results most frequently and most quickly, which may enable the user to save much time and reduce search frustration.

After analyzing which search engine its users prefer, a mobile device service provider may select a search engine for a default search engine to feature on the mobile devices 102-104 sold by the service provider based on the search efficiencies. A search engine provider may optimize its search engine based on the search engine efficiencies that compare the provider's search engine to its competitor's search engines using data that the provider may not be able to access otherwise. Therefore, the search efficiencies that are analyzed for multiple search engines used by the mobile device 102 enable comparisons across search engines that may benefit mobile device users, mobile device service providers, and search engine providers.

The optimizer engine 116 may store multiple search terms input for multiple search engines via multiple mobile devices 102-104 as the search information 118 to the data store 112. The optimizer engine 116 may identify the most frequent search terms during a time period, such as a day, a week, or a month. The optimizer engine 116 may determine which of the most frequent search terms are associated with at least one of multiple media files, such as the twenty most frequent searches for recording artists who will soon be offering new music for downloading. The optimizer engine 116 may configure a media search engine on the mobile device 102 to provide a modified order of access to the multiple media files, such as displaying an artist's newly available music for downloading first on the list of available music to a user who conducted searches using the artist's name. This modified order of access may save the mobile device user much time by enabling the user to more quickly access the available media files in which the user is interested.

The modified order of access may be based on the frequency of the search terms that are input during a time period. For example, the music for the artist names that are searched most frequently is listed before the artist names that are searched less frequently. The media file may be associated with a release date, and the user interface may provide the modified order of access to the media file based on the release date. For example, many users may search for a popular artist's name in anticipation of a forthcoming release of new music. The modified order of access may list this artist's upcoming release to users who may be interested as soon as the music is available for downloading or when the price is established to make the music available for pre-ordering before the release date.

In addition to being based on search terms input by a specific user, the modified order of access may also be based on a profile for the specific user that includes user input for the mobile device, a user request made via the mobile device, demographic information associated with the specific user, and/or a location associated with the specific user's mobile device. For example, the artist's music that is available for downloading may be displayed based not only on how often the user searched for the artist's name, but also based on the user's age and gender and how often the user downloaded similar music. The user input may be associated with a subscription, a purchase, a text message, an e-mail, content downloaded, a response to an advertisement, a location associated with a request for a resource, a time associated with the request for the resource, a social circle, and/or a social circle communication. For example, the user may have entered the artist's name or music in emails or text messages and responded to advertisements featuring the artist. The demographic information may include an age, a gender, a customer service bill, a credit report, an income level, an education level, an occupation, and/or credit card information. The modified order of access may be based on another profile built from user input associated with the second mobile device 104, wherein the other profile is associated with the user's profile based on a predetermined level of matching. For example, if the age, gender, occupation, education level, and income level are the same for the users of the mobile devices 102-104, and the mobile device 104 just downloaded an artist's music, a music availability page for the mobile device 102 may display the artist's music on music availability lists before other artist's music.

The modified order of access may also be based on the location of the mobile device 102. For example, if the mobile device 102 is located in a city where an artist will be performing a concert in two weeks, the artist's music may be listed higher on the music availability list. In another example, if the mobile device 102 is located at the artist's concert location during the time of the concert, the artist's music may be listed higher on the music availability list. The general location of the mobile device may be based on a mailing address specified for a customer service bill. The specific location of the mobile device may be also determined by executing a location fix technology associated with one of a cell tower, a cell sector centroid, an advanced forward link trilateration, a global positioning system, and a hybrid location fix technology.

The more information that is used in determining a user's order of access to media files, such as the user's search terms and communications, the more likely the user will find media files that match their interests before quitting their search on a mobile device media search engine that displays only a limited amount of media files at any time. The order of access may be personalized for each individual user's preferences based on the large amount of information available for determining each specific user's order of access to media files.

The mobile devices 102-104 may take various forms including a personal digital assistant (PDA), a media player, a mobile computer, a digital camera, a mobile telecommunication device, a telephone, a digital music player, a mobile handset, a handheld gaming device, a wireless mobile device, a pager, a portable computer, and a digital calculator. Suitable mobile devices may combine some or all of these functions. The mobile devices 102-104 may communicate by a radio access network providing access to the communication network 108. The server 110 is connected to the communication network 108. The mobile devices 102-104 communicate with the server 110 via the radio access network and the communication network 108. Other communication paths may also be used.

The server 110 may be implemented on a computer. Computers are discussed in detail hereinafter. The optimizer engine 116 may be implemented as a software program. The number and the types of mobile devices, base transceiver stations, networks, servers, user interfaces, optimizer engines, data stores, and search information in FIG. 1 are exemplary.

Figure 2:
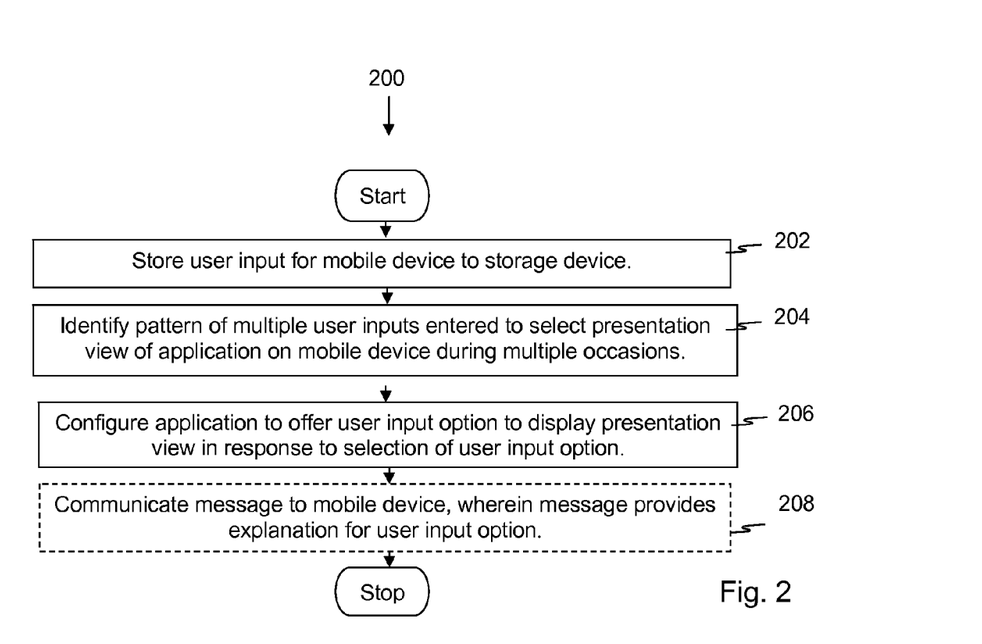
FIG. 2 is a flowchart of a method for a mobile device search optimizer according to some embodiments of the present disclosure.

FIG. 2 shows a flowchart of a method 200 for a mobile device search optimizer according to some embodiments of the present disclosure. The system 100 can execute the method 200 to configure an application to offer application shortcuts to a user based on the user's previous inputs.

In box 202, user input for a mobile device is stored to a storage device. For example, the optimizer engine 116 stores a user's selection of a video from a video title list.

In box 204, a pattern of multiple user input entered to select a presentation view of an application on a mobile device during multiple occasions is identified. For example, the optimizer engine 116 identifies a pattern of recently selected video titles that begin with the letters "r," "s," and "t."

In box 206, the application is configured to offer a user input option to display the presentation view in response to a selection of the user input option. For example, the optimizer engine 116 configures the default video title screen to offer an option to skip to a screen displaying the titles beginning with the letter "s."

In box 208, a message is optionally communicated to mobile device, wherein the message provides an explanation for the user input option. For example, the optimizer engine 116 communicates a message that explains the shortcut to the video titles beginning with the letter "s."

Figure 3:
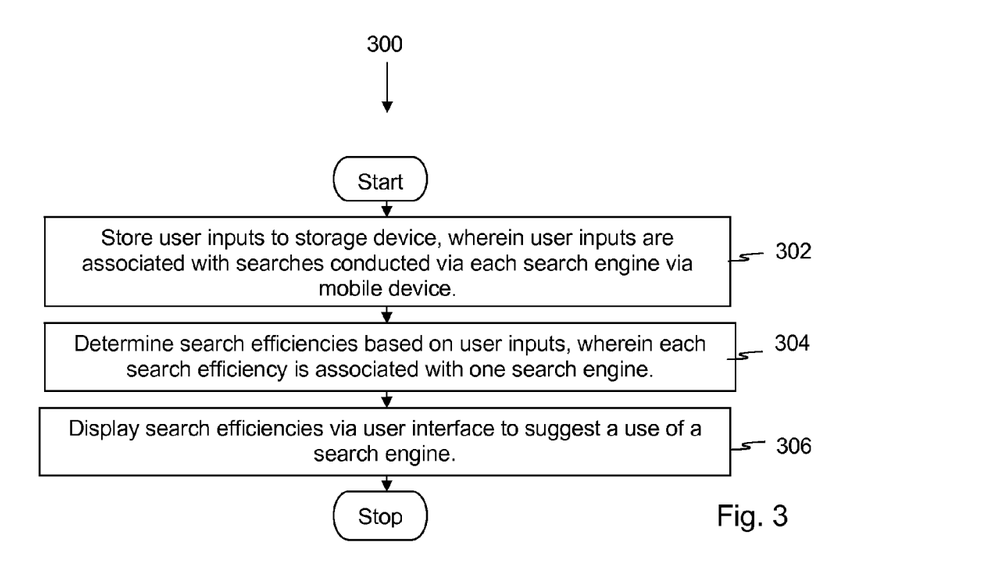
FIG. 3 is a flowchart of another method for a mobile device search optimizer according to some embodiments of the present disclosure.

FIG. 3 shows a flowchart of a method 300 for a mobile device search optimizer according to some embodiments of the present disclosure. The system 100 can execute the method 300 to display personalized search efficiencies to a user for each search engine used by the user.

In box 302, a plurality of user inputs is stored to a storage device, wherein the plurality of user inputs is associated with a plurality of searches conducted via each of a plurality of search engines via a mobile device. For example, the optimizer engine 116 stores the search information 118 for each of the searches conducted via each of the search engines on the mobile device 102.

In box 304, a plurality of search efficiencies is determined based on the plurality of user inputs, wherein each search efficiency is associated with one of a plurality of search engines. For example, the optimizer engine 116 determines that the mobile device's default search engine is the most efficient search engine for the user's entertainment news searches.

In box 306, a plurality of search efficiencies is displayed via a user interface to suggest a use of a search engine of the plurality of search engines. For example, the mobile device 102 displays the efficiencies for the search engines on the mobile device 102. The search efficiencies for the mobile devices 102-104 may be aggregated and displayed by the user interface 114 associated with a mobile device service provider, which may enable the mobile device service provider to configure other mobile devices 102-104 to enable more efficient searches for a larger number of mobile device users. The mobile device service provider may also aggregate the search efficiencies by category and type and sell these aggregated search efficiencies to a search engine provider, which may use these aggregated search efficiencies to improve the efficiency of its search engine.

Figure 4:
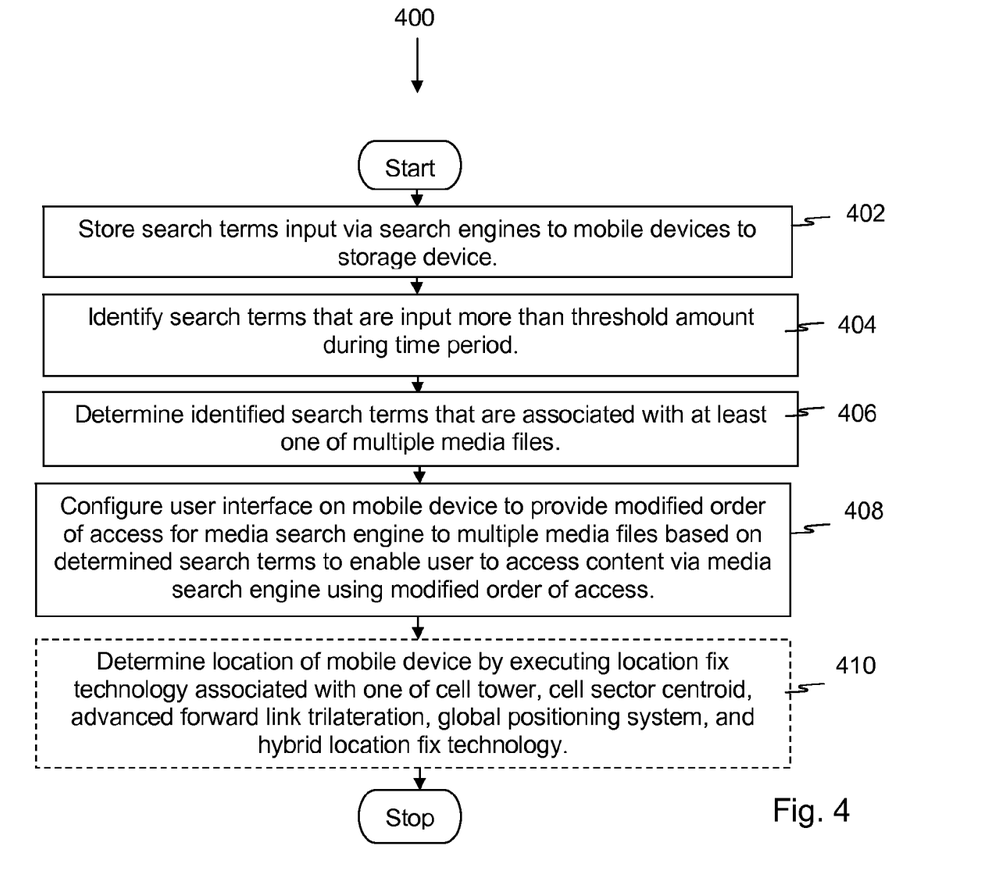
FIG. 4 is a flowchart of yet another method for a mobile device search optimizer according to some embodiments of the present disclosure.

FIG. 4 shows a flowchart of a method 300 for a mobile device search optimizer according to some embodiments of the present disclosure. The system 100 can execute the method 400 to configure an application to provide a modified order of access to a user based on the searches conducted by the user and other users.

In box 402, a plurality of search terms input via a plurality of search engines to a plurality of mobile devices is stored to a storage device. For example, the optimizer engine 116 stores the search terms input to the mobile devices 102-104 during the previous week.

In box 404, a plurality of search terms that are input more than a threshold amount during a time period is identified. For example, the optimizer engine 116 identifies the search terms input on more than 100,000 occasions during the last week, the top ten search terms input during the last month, or the 100 most frequent search terms input in the last week via the mobile devices 102-104 that purchased music downloads during the last month. The optimizer engine 116 may also use other effective types of thresholds as well.

In box 406, the identified plurality of search terms that are associated with at least one of multiple media files are determined. For example, the optimizer engine 116 may determine which of the most frequent search terms are associated with music that is or soon will be available for downloading.

In box 408, the user interface on the mobile device is configured to provide a modified order of access for a media search engine to multiple media files based on the determined plurality of search terms to enable a user to access the content via the media search engine using the modified order of access. For example, the optimizer engine 116 configures the music availability application for the mobile device 102 based on the user's search terms and the most frequent search terms during the previous week.

In box 410, a location of the mobile device is optionally determined by executing a location fix technology associated with a cell tower, a cell sector centroid, an advanced forward link trilateration, a global positioning system, or a hybrid location fix technology. For example, the mobile device 102 determines its location by executing a global positioning system technology.

Figure 5:
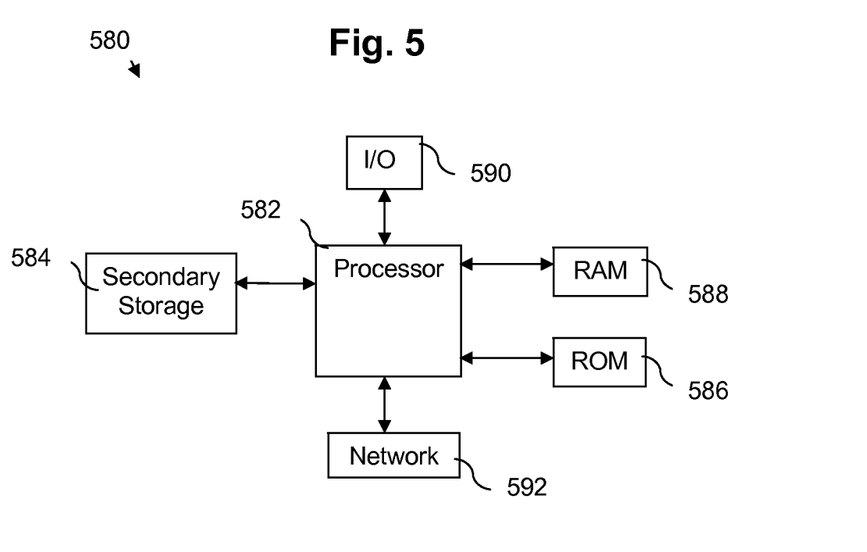
FIG. 5 illustrates an exemplary computer system suitable for implementing the several embodiments of the disclosure.

Some aspects of the system described above, for example the server 110, may be implemented on a computer with sufficient processing power, memory resources, and network throughput capability to handle the necessary workload placed upon it. Other aspects of the system described above, for example the mobile devices 102, 104, may be implemented as a specialized computer or as a mobile telecommunication device, a mobile handset, a personal digital assistant, a wireless mobile device, and a pager. FIG. 5 illustrates a typical computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for a mobile device search optimizer, comprising:
   a storage device;
   a processor; and
   an optimizer engine, when executed by the processor,
      to store, to the storage device, user inputs on multiple occasions of user input when the user inputs are entered into a default view of a user application executing on a mobile device, the default view of the user application having an alternative presentation view determined according to the user inputs entered into the default view,
      to identify a pattern of user inputs from the stored user inputs,
      to configure the presentation view of the user application executing on the mobile device in response to identifying the pattern of user inputs,
      to configure the user application to offer a user input shortcut option determined according to the identified pattern of user inputs to shortcut to the presentation view of the user application from the default view of the user application, wherein when a user of the mobile device selects the user input shortcut option, the user application switches from the default view to the presentation view selected by the user, and
      to communicate an email message to the mobile device, wherein the email message provides an explanation about the offered user input shortcut option.

2. The system of claim 1, wherein the mobile device is one of a mobile telecommunication device, a mobile handset, a personal digital assistant, a wireless mobile device, and a pager.

3. The system of claim 1, wherein the user input shortcut option comprises a navigation element in a document that enables navigation to one of a section of the document and another section of another document.

4. A computer implemented method for a mobile device search optimizer, comprising:
   storing a plurality of user inputs from a mobile device to a storage device, wherein the plurality of user inputs is associated with a plurality of searches conducted via a plurality of search engines via the mobile device;
   analyzing the stored plurality of user inputs from the mobile device based on a plurality of: a selection of search results, a time spent displaying selected search results, a number of pages viewed that are associated with a selected search result, and a subsequent search using a same search term;
   for each of the plurality of search engines, determining a plurality of search efficiencies for each category of a plurality of categories of search terms based on the analyzing;
   parameterizing the analyzed stored plurality of user inputs and the plurality of search efficiencies according to the plurality of categories of search terms; and
   responsive to the parameterizing, displaying the plurality of categories of search terms and the plurality of search efficiencies for the plurality of search engines associated with each of the plurality of categories of search terms via a user interface of the mobile device based on the determining to suggest a use of a search engine of the plurality of search engines by the mobile device.

5. The computer implemented method of claim 4, wherein the user interface is associated with the mobile device, and displaying the plurality of search efficiencies enables a user of the mobile device to select one of the plurality of search engines for a search based on the plurality of search efficiencies.

6. The computer implemented method of claim 4, wherein the user interface is associated with a mobile device service provider, and displaying the plurality of search efficiencies enables the mobile device service provider to select one of the plurality of search engines for a default search engine based on the plurality of search efficiencies.

7. The computer implemented method of claim 4, wherein the user interface is associated with a search engine provider, and displaying the plurality of search efficiencies enables the search engine provider to optimize a provided one of the plurality of search engines.

8. A system for a mobile device search optimizer, comprising:
   a storage device;
   a processor; and
   an optimizer engine, when executed by the processor,
      to store a plurality of search terms input via a plurality of search engines by a plurality of mobile devices to the storage device,
      to identify the plurality of search terms that are input most frequently during a time period prior to an upcoming release date of at least one of a plurality of media files,
      to determine that the identified plurality of search terms that are input most frequently in the time period are associated with the at least one of the plurality of media files, wherein the at least one of the plurality of media files has yet to be released to a public audience and is associated with an upcoming release date that indicates a date of a forthcoming release of the at least one of the plurality of media files to the public audience,
      to determine that user input to at least one of a text message or an email is associated with the at least one of the plurality of media files, and
      to configure a user interface on a mobile device associated with a media search engine providing a modified order of access of the plurality of media files to provide the at least one of the plurality of media files before a remainder of the plurality of media files, wherein the modified order of access is based on the determined plurality of search terms in the time period, a profile specific to a user of the mobile device, and the determined user input, and wherein the configured user interface provides the modified order of access to the at least one of the plurality of media files based on the upcoming release date and enables the user to access content via the media search engine using the modified order of access.

9. The system of claim 8, wherein the modified order of access enables the mobile device to display selections of user input to access the plurality of media files via the mobile device in an order based on a frequency of the plurality of search terms that are input during the time period.

10. The system of claim 8, wherein the modified order of access enables the user of the mobile device to provide less user input to access the plurality of media files via the media search engine than required to access the content via an unmodified order of access.

11. The system of claim 8, wherein the profile specific to the user of the mobile device comprises at least one of a second user input for the mobile device, a user request made via the mobile device, demographic information associated with the user, and a location associated with the mobile device.

12. The system of claim 11, wherein the second user input is associated with at least one of a subscription, a purchase, content downloaded, a location associated with a request for a resource, a time associated with the request for the resource, a social circle, and a social circle communication.

13. The system of claim 11, wherein the demographic information comprises at least one of an age, a gender, a customer service bill, a credit report, an income level, an education level, an occupation, and credit card information.

14. The system of claim 11, wherein the modified order of access is further based on another profile built from user input associated with another mobile device, wherein the other profile is associated with the profile based on a predetermined level of matching.

15. The system of claim 11, wherein the location of the mobile device is determined by executing a location fix technology associated with one of a cell tower, a cell sector centroid, an advanced forward link trilateration, a global positioning system, and a hybrid location fix technology.

16. The system of claim 11, wherein the location of the mobile device is based on a mailing address specified for a customer service bill.

17. The computer implemented method of claim 4, wherein each category of search terms is uniquely associated with a search efficiency that indicates which of the plurality of search engines produced a desired result most frequently or most quickly for the category of search terms.

18. The system of claim 8, wherein the at least one of the plurality of media files is a musical audio media file.

\* \* \* \* \*